United States Patent [19]
Roles

[11] Patent Number: 5,220,755
[45] Date of Patent: Jun. 22, 1993

[54] HIGH PRESSURE WATER DISTRIBUTOR FOR DOWNPIPES

[75] Inventor: Clemence Roles, Saskatoon, Canada
[73] Assignee: Rotec Inc., Minot, N. Dak.
[21] Appl. No.: 842,623
[22] Filed: Feb. 27, 1992
[51] Int. Cl.$^5$ .................. E04D 13/08; B05B 1/14
[52] U.S. Cl. .......................... 52/16; 52/11; 239/208; 239/547; 24/19
[58] Field of Search ............. 52/16, 11, 169.1, 169.5; 239/208, 282, 537, 197; 137/357, 269; 24/19, 20 TT, 20 EE

[56] References Cited

U.S. PATENT DOCUMENTS

| | | | |
|---|---|---|---|
| 964,464 | 7/1910 | Crawford-Frost | 239/208 |
| 1,322,189 | 11/1919 | Holt | 52/16 |
| 1,504,038 | 8/1924 | Geaslen | 137/357 |
| 1,693,556 | 11/1928 | Spencer . | |
| 2,776,169 | 1/1957 | Aschenbrenner | 239/391 |
| 2,814,529 | 11/1957 | Arnt | 239/208 |
| 3,904,121 | 9/1975 | Geagan | 239/208 |
| 3,966,121 | 6/1976 | Littman | 239/208 |
| 4,372,493 | 2/1983 | Smith | 239/208 |
| 4,523,875 | 6/1985 | DiFiore | 52/16 |

FOREIGN PATENT DOCUMENTS

| | | | |
|---|---|---|---|
| 3105744 | 9/1982 | Fed. Rep. of Germany | 52/16 |
| 0642946 | 7/1962 | Italy | 24/19 |
| 0360192 | 3/1962 | Switzerland | 52/16 |
| WO8503493 | 8/1985 | World Int. Prop. O. | 24/20 TT |

Primary Examiner—Carl D. Friedman
Assistant Examiner—Winnie Yip

[57] ABSTRACT

A high pressure water distributor for downpipes. The distributor includes a tube made of a flexible or rigid material having a water tight base and an outlet port. Rain water that is directed into the downpipe is accumulated in the tube and generates a pressure head. As a result of this pressure head the velocity and discharge volume of water from the outlet port increases substantially. The discharged water can be directed through a conventional garden hose, which may be connected to a sprinkler or similar device or the water can simply be conveyed to a remote location from the foundation of the dwelling.

5 Claims, 2 Drawing Sheets

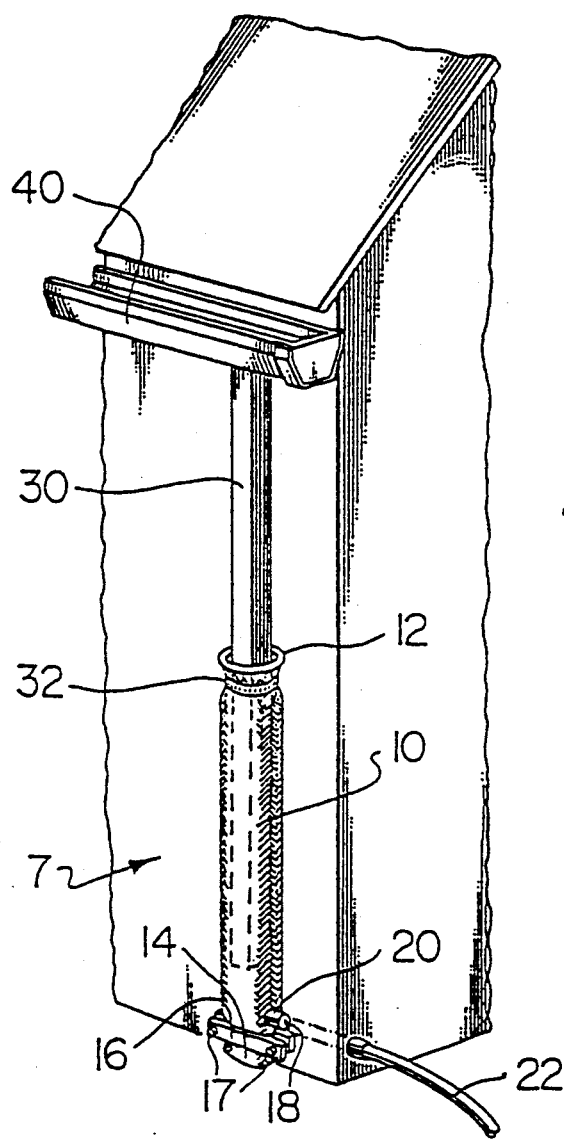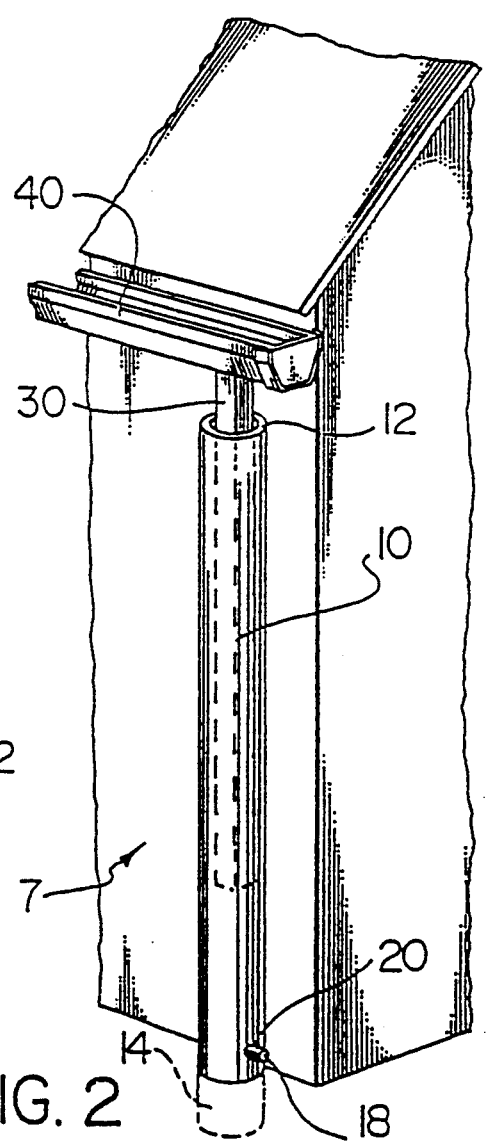

HIGH PRESSURE WATER DISTRIBUTOR FOR DOWNPIPES

FIELD OF THE INVENTION

This invention relates to a high pressure water distributor device used to direct rain water from an eavestrough system to a location directed away from the foundation of the dwelling. In particular, the distributor device can be attached to an existing downpipe and direct water at high pressure through a conventional garden hose to a remote location.

1. Background of the Invention

Current residential and small commercial dwellings often use an eavestrough system to collect rain water from the roof and direct the water down a plurality of downpipes. The downpipes are normally located along various walls of the dwelling with downspout elbows at the base of the downpipes. The downspout elbows attempt to direct water away from the foundation of the dwelling.

One of the main purposes of an eavestrough system is to protect the perimeter foundation of the dwelling from water damage, which may cause basement flooding or differential settlement of the foundation. Therefore, it is important that the water drained from the roof be directed to a location sufficiently far from the base of the foundation.

2. Prior Art

Presently various forms of horizontal extensions have been proposed. These extensions generally consist of a pipe or a large plastic tube that is attached to and stretched out from the downpipe or downspout. These systems are low pressure systems or gravity systems, whereby no substantial pressure head is generated in the system. They are merely used to distribute water in a small area immediately surrounding the extension portion.

Examples to these low pressure systems are shown in U.S. Pat. Nos. 2,814,529 and 3,966,121 issued on Nov. 26, 1957 and Jun. 29, 1976, respectively. These devices disclose low pressure downpipe extensions with a plurality of holes located in the tubing to permit water to be distributed in the immediate area.

Underground systems have also been proposed. These systems use a large semi-rigid tube graded to an underground pit or to a low location on the property. Similarly, these systems merely direct water flow through a conduit at low pressure since no substantial pressure head is generated in the system. In addition, this type of system is very inflexible as water is always drained to the same location.

A downspout distributor has been proposed in U.S. Pat. No. 3,904,121 issued Sep. 9, 1975. This distributor is designed to minimize the discharge water pressure and distribute the water in a manner which eliminates gouging of lawns. This prior art system uses small apertures located on the downspout to spray the immediate surrounding area. In addition, this system uses hose coupling openings at the sides of the downspout elbow. These are used to attach soaker hoses for light distribution of the rain water. This type of system is unsatisfactory because it is designed to work at slight pressure.

In particular, in one configuration disclosed in U.S. Pat. No. 3,904,121 water is discharged over a relatively small area near the downpipe. Another configuration uses commercial soaker hoses in which the rain water is placed very near the foundation of the dwelling. In addition, this configuration has limited capacity because only slight pressure is established in the system and can only accommodate a very light rain. As a result, this system will not be capable of directing rain water at a sufficient pressure to drive a sprinkler type device or to convey the water to a distant location, which could include lifting the water above the grade of the bottom of the downpipe or over rough terrain.

These prior art systems are all based on low pressure distribution of rain water run-off from a roof of a dwelling or similar structure. For example, these systems would not be capable of directing the rain water to a holding tank located at a considerable distance from the downpipe. Consequently, these prior art systems do not effectively manage the distribution of rain water.

SUMMARY OF THE INVENTION

An object of the present invention is to provide a rain water distributor device that generates a pressure head to permit the conveyance of water away from the foundation of the dwelling. The re-directed rain water can be used to irrigate lawns, trees, gardens or flower beds. In addition, surplus water can be disposed of as is often the case with industrial, commercial, rural, nursery, farm and acreage locations.

A further object of the present invention is to provide a device that can be easily attached to an existing downpipe, which may be of different sizes and shapes (circular, rectangular or square) even if the downpipe is old and somewhat damaged. A conventional garden hose can then be connected to the base of the distributor device and convey rain water away from the foundation of the dwelling.

To provide the generation of a high pressure distributor, the present invention provides a flexible or rigid tubing that can be placed over an existing downpipe with a water tight seal at the base thereof. The tubing is installed over a downpipe and held in a fixed position on the downpipe a distance above the base of the downpipe thereby providing a means for generating a pressure head.

The tubing can be either clamped around the downpipe to produce a water tight seal or left partially open to permit excess rain water to drain over the top edge of the tube, which is useful in certain operating conditions to avoid excess pressure building in the downpipe during an intense rain storm. Hose couplings can be located at the base of the tubing to permit the attachment of conventional garden hoses. The area of the roof to be drained and the geographical location of the dwelling will determine whether one or more outlets will be used.

In accordance with an aspect of this invention there is provided a water distribution device adapted for use with a downpipe having an open end, said distribution device comprising: an elongated hollow member having an open upper end and a lower end, said hollow member being mountable on said open end of said downpipe in water receiving communication with said open upper end of said hollow member; a water discharge opening forming a flow path of substantially less cross sectional area than the average cross sectional area of said hollow member; closure means for closing off the lower end of said hollow member; and holding means used to selectively engage said hollow member in a fixed position about said downpipe, whereby a pressure head is established when rain water is directed into said downpipe.

A more detailed description of preferred embodiments of the distributor device will now be set forth in reference to the drawings.

DESCRIPTION OF THE DRAWINGS

In the drawings, wherein like numerals of reference indicate corresponding parts in the various figures, in which:

FIG. 1 is a perspective view of a water distributor in use on a downpipe of an eavestrough;

FIG. 2 is a perspective view of the high mount embodiment of the present invention;

DETAILED DESCRIPTION OF PREFERRED EMBODIMENTS

Figure 3:
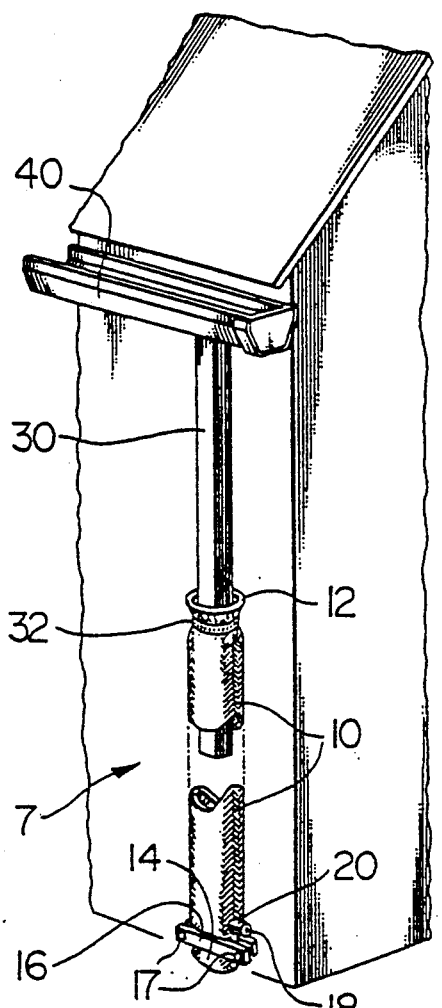
FIG. 3 is a perspective view of the mid-clamp embodiment of the present invention.

FIG. 1 illustrates a distributor 7 comprising a tube 10 having a top 12, a base 14, an outlet port 18 and a base clamp 16 held together with bolts 17.

The tube 10 is hollow and can be of any cross section provided that tube 10 can be placed over a downpipe 30 in order to place tube 10 in water receiving communication with downpipe 30. Consequently, if downpipe 30 has a circular cross section then it would be ideal for tube 10 to also have a circular cross section. However, in various embodiments discussed with reference to subsequent figures a circular tube 10 could easily be used on a square or rectangular downpipe 30.

The tube 10 can be made of either a flexible or rigid material. If tube 10 is made from a flexible material such as rubber or vinyl a tube clamp 32 can be used to attach tube 10 to downpipe 30 in order to maintain tube 10 in a fixed position about downpipe 30. The tube clamp 32 can also provide, depending on the configuration being used, a relatively water tight seal between tube 10 and downpipe 30. It is not always necessary, however, for tube clamp 32 to provide a water tight seal provided the required pressure head can be established.

If tube 10 is made from a more rigid material then tube clamp 32 may be used to anchor tube 10 to an adjoining wall or to downpipe 30 itself. In a rigid tube arrangement top 12 of tube 10 remains open thereby leaving an overflow region that will regulate the pressure head generated in the system.

Alternatively, tube clamp 32 can be omitted in a rigid tube arrangement because base 14 of tube 10 can be anchored into the ground with downpipe 30 in water receiving communication with top 12 of tube 10. Merely anchoring tube 10 into the ground will provide the necessary support for distributor 7 to function properly. As an alternative embodiment (not shown) the rigid tube 10 can sit on a base plate directly on the ground.

The base clamp 16 is removably attached at base 14 of tube 10 to provide a water tight seal. During operation of the device base clamp 16 is firmly engaged about base 14 by bolts 17. However, bolts 17 can be removed to allow for the removal of debris such as leaves and dirt trapped in tube 10. In addition, base 14 can be left open over winter when ice becomes a factor in colder climates.

The outlet port 18 is provided near base 14 of tube 10. The location of outlet port 18 is largely dependent on the user's requirements. In some instances two or more outlet ports 18 can be arranged around base 14 of tube 10. The actual number of outlet ports will depend on a number of factors including roof area and rain characteristics. In order to maximize the pressure head generated in the system outlet port 18 should be relatively close to base clamp 16. However, if only a small pressure head is desired outlet port 18 can be mounted anywhere on tube 10 to provide the required pressure head.

Outlet port 18 is provided with a hose coupling 20, which would permit the attachment of a conventional garden hose 22 or other less costly and more rigid tubing where it is desirable to bury the hose.

The tube 10 can be mounted on existing downpipe systems in a number of ways. However, in any alternative there must be a water tight pressure head capable of being generated sufficient to provide a reasonably high outlet velocity.

When rain water is accumulated in distributor 7 a pressure head is established. The pressure head is measured as the distance between the top of the water level and the midpoint of outlet port 18. The top of the water level is dependent on the rate at which rain water is being directed into distributor 7 and the length and arrangement of tube 10 and outlet port 18.

There are a number of possible mounting arrangements for this invention, which provide varying amounts of pressure head and as a result variable outlet velocities and discharge volumes.

FIG. 2 illustrates a high mount alternative in which a tube 10 is attached to the immediate downpipe 30 located just below the horizontal gutter of an eavestrough 40. The tube 10 can be secured into a fixed position by using tube clamp 32 or in the case of a rigid tube 10, base 14 can be anchored into the ground (as illustrated). The length of tube 10 varies (for example, from 1 inch to 10 ft.) depending on requirements and on the condition of downpipe 30.

FIG. 3 illustrates a mid-clamp alternative with the complete downpipe 30 installed. Tube 10 is engaged around downpipe 30 such that downpipe 30 is substantially entrained in tube 10. Tube clamp 32 then anchors tube 10 to downpipe 30 or to a adjoining wall. The pressure head is established simultaneously in downpipe 30 and tube 10.

In the embodiments illustrated in FIGS. 2 and 3 the required pressure head will be generated in tube 10 and/or downpipe 30 and therefore a water tight seal by top clamp 32 is not necessarily required.

FIG. 5 illustrates a variable position clamp alternative with the complete downpipe installed. In this embodiment tube 10 is inserted over downpipe 30 and can be clamped at any height, i.e. position 1, 2 or 3 depending on the user's requirements. For example, for a high outlet velocity, clamp 32 can be placed at position 3, which will provide a pressure head of $H_3$. For low velocity requirements clamp 32 can be placed at position 1, which will provide a pressure head of $H_1$. Similarly, for medium velocity requirements clamp 32 can be placed at position 2.

Figure 4:
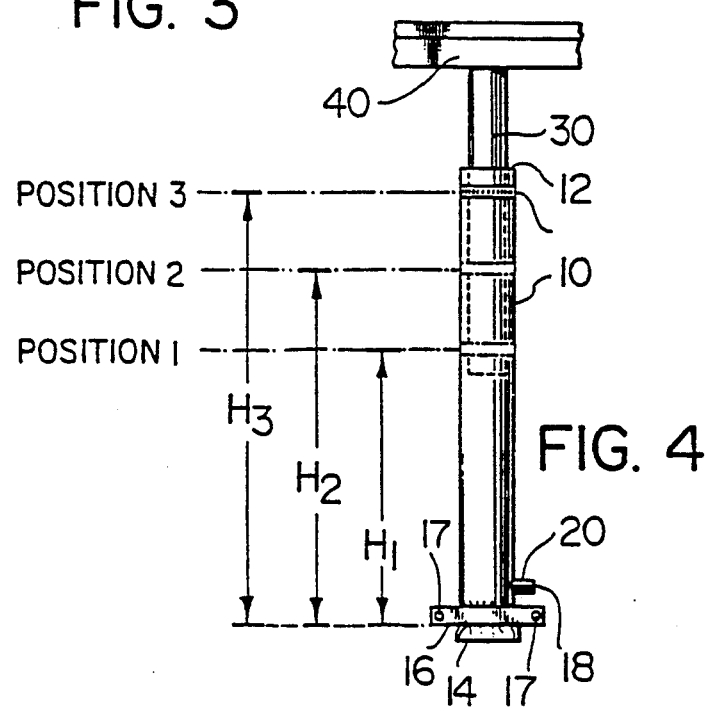
FIG. 4 is a plan view of the variable position clamp embodiment of the present invention.

It should be noted that FIG. 4 is a composite drawing of various clamp locations. The material of tube 10 must be removed above the desired clamping location (position 1, 2 or 3) and clamp 32 must attach tube 10 to downpipe 30 in a manner so as to allow the rain water to escape out of top 12 of tube 10. Under heavy or extreme rainfall conditions the head may not limit to the position of the clamp because the rain water can not escape at the required rate and thus would build up not only in tube 10 but also in the downpipe 30.

The outlet velocity of the water from outlet port 18 is controlled by the pressure head generated within the distributor 7. The discharge volume from outlet port 18 is dependent on the pressure head and the area of outlet port 18. The following examples indicate the range in pressure head and its relationship to the outlet velocity and the discharge volume.

The following variable definition chart details the various parameters used in the calculations of Examples 1 and 2:

Definition of Variables

H: head or height of a column of water
A: outlet port area
A = 0.00213 ft² for ⅜" garden hose
p: pressure
$\gamma$: specific weight
$\gamma = 62.43$ lb/ft³ for water
v: outlet velocity
Q: volume of outlet flow
$C_d$: discharge coefficient ($C_d = C_c \times C_v$)
$C_c$: contraction coefficient
$C_c = 0.62$ for sharp edge aperture
$C_c = 0.97$ for well rounded aperture
$C_v$: velocity coefficient
$C_v = 0.97$ for water
g: gravitational constant
g = 32.2 ft/s²

EXAMPLE 1

Let $H = 3$ ft.
- Assume H remains constant
- neglect any losses due to friction etc.

Pressure of water in-line with outlet port:

$p = \gamma H$ = 62.43 lb/ft³ × 3 ft
      = 187.29 lb/ft²

Velocity of water at outlet port:

$v = C_v \times \sqrt{2gH}$ = 0.97 × sqrt(2 g 3 ft)
      = 0.97 × 13.90
      = 13.48 ft/s Volume of outlet flow:
- assume sharp edge aperture $C_c = 0.62$ $Q = C_d \times A \times \sqrt{2gH}$ = $C_c \times A \times 13.48$
      = 0.62 × 0.00213 × 13.48
      = 0.0178 ft³/s
      ≈ 8 US gallons/min

- for a well rounded aperture $C_c = 0.97$ $Q = 0.97 \times 0.0287 = 0.0279$
      ≈ 12.5 US gallons/min

EXAMPLE 2

Let $H = 7$ ft.
- Assume H remains constant
- neglect any losses due to friction etc.

Pressuer of water in-line with outlet port:

-continued $p = \gamma H$ = 62.43 lb/ft³ × 7 ft
      = 437.01 lb/ft²

Velocity of water at outlet port:

$v = C_v \times \sqrt{2gH}$ = 0.97 × sqrt(2 g 7 ft)
      = 0.97 × 21.23
      = 20.60 ft/s Volume of outlet flow:
- assume sharp edge aperture $C_c = 0.62$ $Q = C_d \times A \times \sqrt{2gH}$ = $C_c \times A \times 13.48$
      = 0.62 × 0.00213 × 20.60
      = 0.0272 ft³/s
      ≈ 12 US gallons/min

- for a well rounded aperture $C_c = 0.97$ $Q = 0.97 \times 0.0439 = 0.0426$
      ≈ 19 US gallons/min

Rain Water Run-off Calculations

For a residential home with a peaked roof, one side having an area of 560 ft² a rainfall of 1"/hr will generate approximately (560 ft² × 1/12 ft × 1/3600s = 0.0130 ft³/s) 6 US gallons/min of rain water down one downpipe. This fairly heavy rain fall situation can be easily handled by the present invention as shown by the discharge capacities in Examples 1 and 2.

Examples 1 and 2 illustrate that the velocity and volume of outflow increase with the height of the pressure head assuming other variables such as outlet area remain constant. This invention is capable of generating pressure heads ranging from 1 to 2 feet up to the maximum height of the eavestrough roof line depending on the user's requirements.

For example, if the user requires a relatively low velocity and low discharge output then a head of 3 ft would be sufficient to provide an outlet velocity of approximately 14 ft/s and a discharge volume of 8 US gallons/min.

However, if the user requires substantially higher outlet velocities and discharge volume, then the tube can be arranged to provide a pressure head of 7 ft. This will provide an outlet velocity of approximately 21 ft/s and a discharge volume of approximately 12 US gallons/min. These outlet results could be used to drive a sprinkler or will convey water down a conventional garden hose to remote locations on the property.

I claim:

1. In combination with a downpipe having a lower open end, a rainwater distribution device comprising:
   an elongated hollow member having an open upper end and an open lower end, said hollow member slidably engagable over said downpipe such that said open upper end is located over said downpipe a substantial distance above the lower open end of said downpipe, said hollow member thereby being in water receiving communication with rainwater flowing down said downpipe;
   a water discharge opening located in said hollow member proximate said open lower end and substantially below the open upper end of said hollow member, the cross-sectional area of said water discharge opening being substantially less than the average cross-sectional area of said hollow member;

a hose coupling mounted on said hollow member and aligned and in fluid communication with said water discharge opening;

a closure means located on said hollow member at said open lower end for stopping rainwater from flowing through said open lower end; and a holding means engaging the hollow member for holding the hollow member in a fixed position with respect to the downpipe such that rainwater flowing down said downpipe can escape from the upper end of the hollow member; whereby said substantial distance provides a predetermined water pressure head.

2. The water distribution device of claim 1, wherein said closure means is a removable clamp.

3. The water distribution device of claim 1, wherein said elongated hollow member is made from a flexible material capable of retaining water therein.

4. The water distribution device of claim 1, wherein said elongated hollow member is made from a rigid material capable of retaining water therein.

5. The water distribution device of claim 1 or 3, wherein said holding means is a clamp means located proximate said open upper end of said elongated hollow member.

* * * * *